No. 734,523. PATENTED JULY 28, 1903.
H. W. EDWARDS.
COMBINED HOT BLAST OVEN AND DUST COLLECTOR.
APPLICATION FILED DEC. 9, 1902.
NO MODEL. 3 SHEETS—SHEET 1.

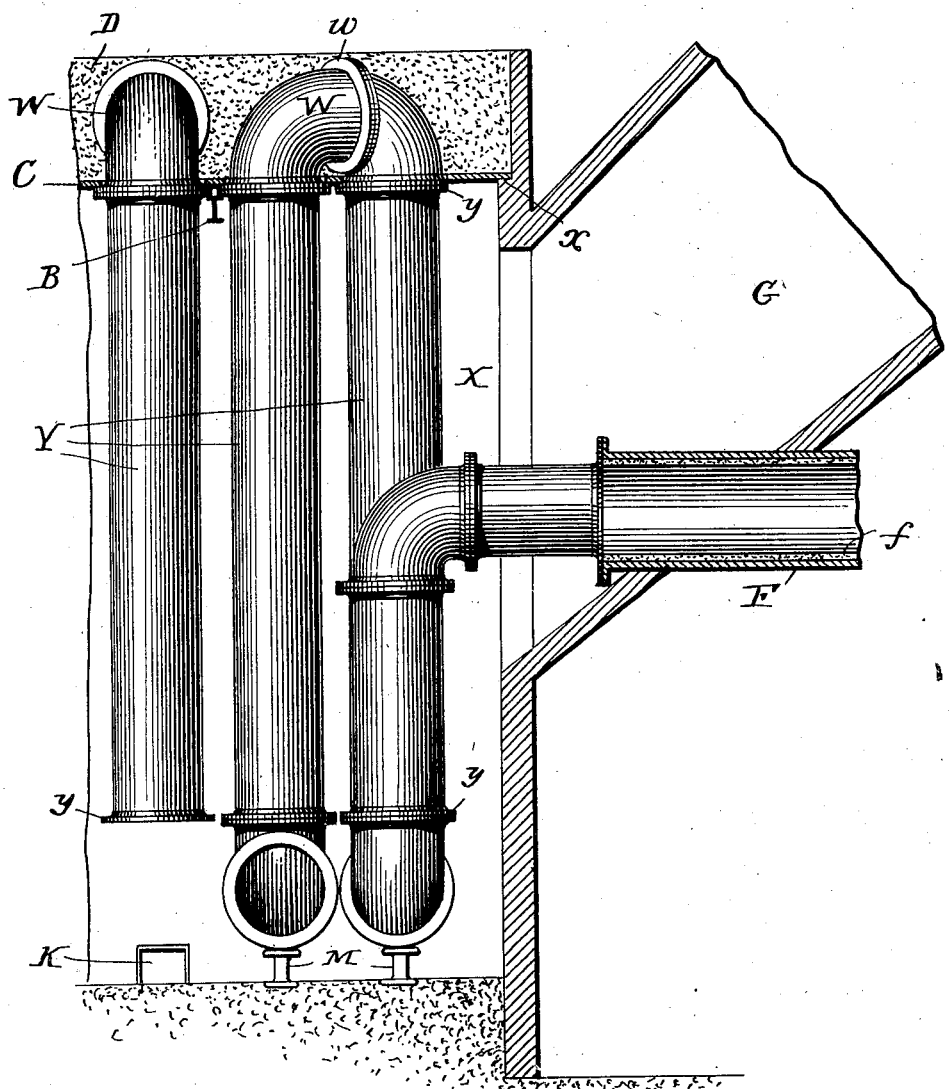

No. 734,523.

Patented July 28, 1903.

UNITED STATES PATENT OFFICE.

HENRY W. EDWARDS, OF OAKDALE, GEORGIA, ASSIGNOR TO THE LODER PYRITIC REDUCTION COMPANY, OF BOSTON, MASSACHUSETTS, A CORPORATION OF COLORADO.

COMBINED HOT-BLAST OVEN AND DUST-COLLECTOR.

SPECIFICATION forming part of Letters Patent No. 734,523, dated July 28, 1903.

Application filed December 9, 1902. Serial No. 134,568. (No model.)

*To all whom it may concern:*

Be it known that I, HENRY W. EDWARDS, a subject of the King of Great Britain, residing at Oakdale, Cobb county, State of Georgia, have invented certain new and useful Improvements in a Combined Hot-Blast Oven and Dust-Collector, of which the following is a specification.

This invention relates to flue dust-collectors and blast-heaters especially adapted for use in connection with smelting-furnaces for lead, silver, gold, copper, and other ores; and the object of the invention is to provide improved means for condensing and separating volatile matter and fuel and ore dust from the gases which escape from the furnace into the smoke-stack and at the same time to utilize the heat of the said gases for heating the blast on its way to the furnace.

While my invention may be embodied in apparatus of widely-different forms and arrangements, I have in the accompanying drawings illustrated a preferred form of apparatus for carrying out my invention, in which drawings—

Figure 1:
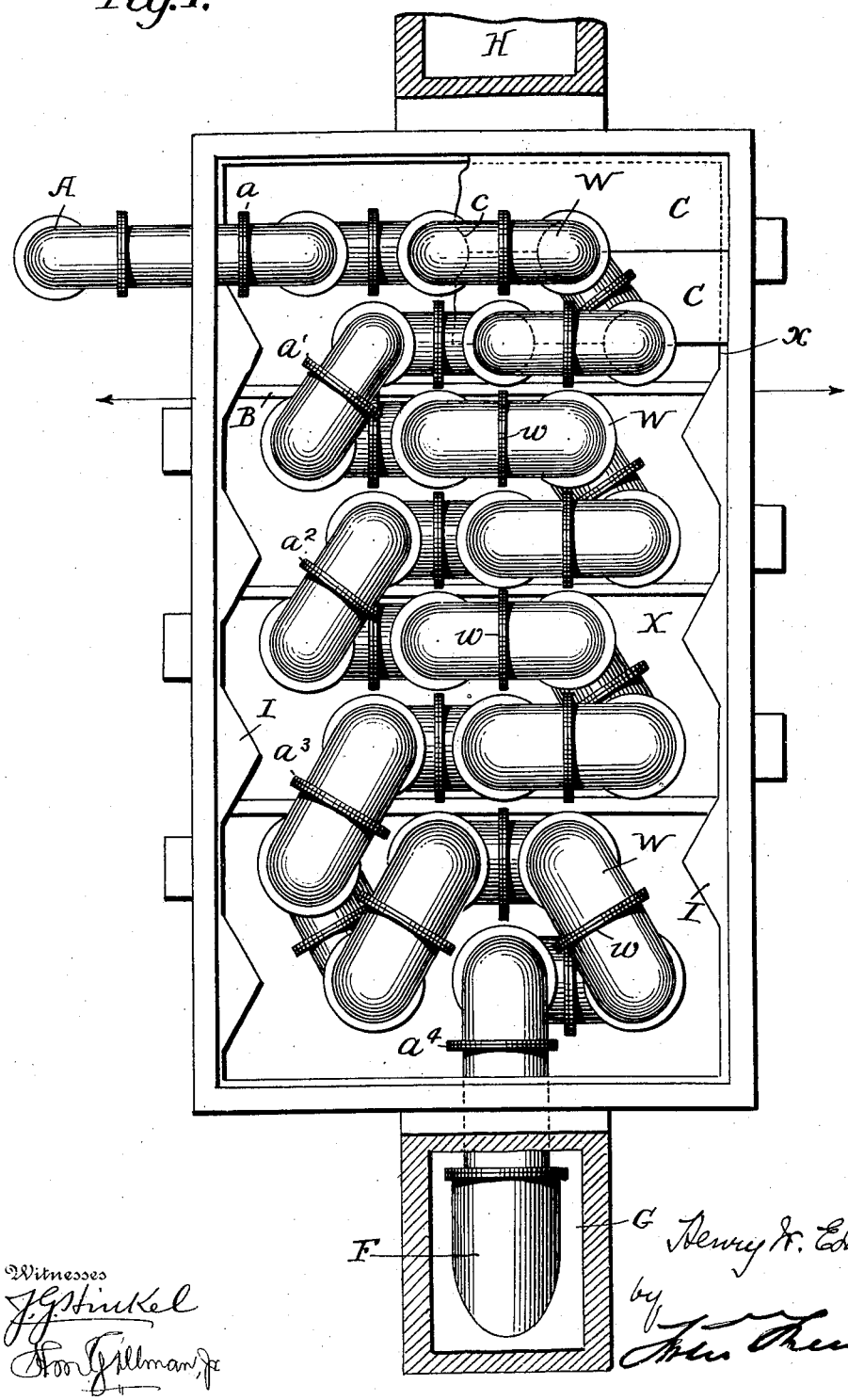
Figure 2:
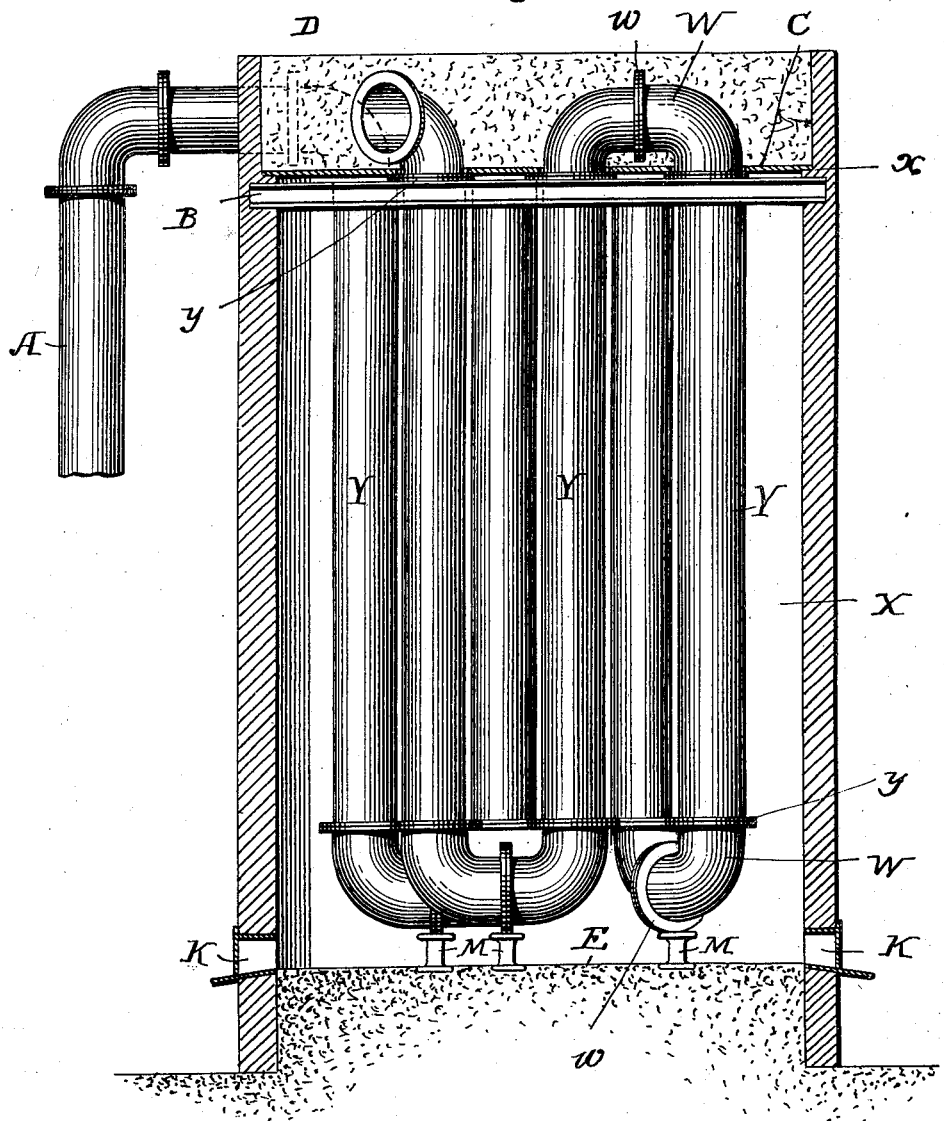

Figure 1 is a top view of a heating and dust chamber with the cover removed, showing a preferred arrangement of pipes through which the blast travels on its way to the furnace. Fig. 2 is a vertical transverse section. Fig. 3 is a portion of a longitudinal section, showing particularly the end of the chamber which is connected to the furnace-flue and the blast-pipe which leads to the furnace.

There is a chamber X of any desired dimensions and shape, and, as shown, it is rectangular and of greater length than width. A flue G, which leads from a furnace, (not shown,) enters the chamber at one end to convey the waste gases from the furnace to the chamber. Another flue H leads from the other end of the chamber to a chimney or stack. (Not shown.)

Within the chamber X are a series of vertical pipes Y, arranged in staggered relation to each other and so connected at their ends that they form a tortuous continuous passage or conduit for the blast on its way to the furnace. The first of the series of pipes Y near the outlet end of the chamber X is connected to a pipe A, which leads out of the chamber and will be connected to a suitable blowing apparatus. (Not shown.) The last of the series of pipes Y at the inlet end of the chamber X is connected to a pipe F, which will lead to the furnace. Preferably the pipe F will be enlarged to receive a lining of firebrick *f* or some other suitable material for preventing escape of heat. This, however, is not essential, as the pipe might be covered with a suitable jacket for the same purpose, or the lining and jacket may both be omitted.

While the vertical pipes Y may all be of the same diameter, I preferably make them of gradually-increasing diameter from the end where the blast enters from pipe A, as is more particularly shown in Fig. 1. One object of this is that as the air passes on through the system of pipes Y it will gradually become hotter as it approaches the end of the chamber where the gases from the furnace enter, and consequently become more and more expanded, and unless the area of the conduit increased there would be considerable back pressure on the blowing apparatus and consequent diminution of the supply of air to the furnace and a waste of power for running the blower.

The ends of the pipes Y may be connected in various ways; but preferably each pipe is provided with a flange *y* at each end, and coupling-elbows W are employed for connecting the ends of the pipes. Preferably, also, these elbows will be in two sections bolted together, each section being provided with a flange *w* at each end, and one section may be of less diameter than its mate, whereby a pipe Y of one diameter may be connected to another pipe Y of greater or less diameter.

The system of pipes Y will preferably be supported at their lower ends above the floor E of the chamber, thereby forming a space in which the dust, &c., which is separated from the furnace-gases may collect, and from which space it may be removed through doors K in the sides of the furnace. As shown, I provide pedestals M, on which the several lower coupling-elbows rest. In order to further support and steady the pipes Y, I provide a series of beams B, supported by opposite sides of the chamber X and so located that the upper flanges of some of the pipes Y will rest upon them, and they also serve to divide said pipes into groups. They are also so arranged that by disconnecting the sections of some of the upper coupling-elbows—that is, those coupling-elbows which connect a pipe in one group to a pipe in an adjacent group and which couplings extend over and across the beams B—groups of connected pipes may be lifted out of the chamber without disconnecting any of the lower couplings. Thus if the flanges indicated $a$ and $a'$ were disconnected the group of pipes between the end wall of the chamber and the adjacent beam B could be lifted out together, or the flanges at $a'$ and $a^2$ or at $a^2$ and $a^3$ or at $a^3$ and $a^4$ may be disconnected and the groups of pipes between the beams B or between the wall at the inlet end of the chamber and the adjacent beam, respectively, may then be lifted out.

It is desirable to provide a roof or cover for the chamber which may easily be removed when necessary and which also will effectively prevent the escape of heat. This may be accomplished in various ways; but preferably I employ a series of metal plates C and support them upon the flanges of the upper coupling-elbows, which are connected to the flanges at the upper ends of the pipes Y, and these plates are cut out, as indicated at $c$, to fit around the couplings. Portions of two of these plates are indicated in Fig. 1. The plates are also supported at their ends by the side walls of the chamber, as indicated at $x$ in Fig. 2. Upon these plates is a layer of ashes, sand, or other suitable material D, in which the upper elbow-couplings are entirely embedded, and it is obvious that the material D and the plates C may be easily removed whenever it becomes necessary to have access to the pipes or couplings.

As before stated, the pipes Y are arranged in staggered relation to each other, the object being that the hot gases in passing through the chamber X will be compelled to travel in tortuous courses and come into contact with all the pipes. To further aid in directing the gases among the pipes and prevent any portion thereof from pursuing a direct course between the sides of the chamber and the pipes, I provide a series of baffles I on each side of the chamber, which extend at an angle to the wall to deflect the gases toward the pipes.

The arrangement of the pipes Y as illustrated has been found very convenient and efficient in practice; but it is to be understood that I do not limit my invention to such arrangement, for it is obvious the pipes could be arranged in many different ways to present an extended pipe area in the path of the moving gases to check their velocity and absorb their heat; also, while for the reason previously stated it is desirable to have the pipes Y gradually decrease in diameter from the inlet to the outlet end of the chamber it is not absolutely essential. Another advantage, however, arising from this arrangement is that as the gases approach the outlet end of the chamber X there is a larger unobstructed area, and consequently the gases can expand, and thereby decrease their velocity and allow small particles of ore and fuel in the form of dust and condensed volatile matter to settle on the floor E of the chamber.

From the foregoing description it will be apparent that the hot gases as they pass through the chamber will be compelled to travel in tortuous courses between the pipes, thereby imparting much of their heat to the pipes, which latter will also arrest much of the ore and fuel dust which escapes from the furnace. The velocity of the gases will also be decreased and the volatile matter contained in the gases will be condensed, particularly by the colder pipes at the outlet end of the chamber, and this dust and condensed volatile matter will settle on the floor of the chamber. The blast entering through pipe A will become gradually heated as it flows through the pipes Y on its way to the furnace.

Without limiting myself to the special details of construction illustrated and described, I claim—

1. The combination of a chamber having an inlet and an outlet for hot furnace-gases, of a series of pipes arranged vertically in staggered relation within the chamber, and connected to form a continuous conduit for a blast, and means for supplying the blast to the end pipe nearest the outlet of the chamber, said pipes offering less obstruction to the passage of the gases at the outlet end of the chamber than at the inlet end, substantially as set forth.

2. The combination of a chamber having an inlet and an outlet for hot furnace-gases, of a series of pipes arranged vertically in staggered relation within the chamber, and connected to form a continuous conduit for a blast, and means for supplying the blast to the end pipe nearest the outlet of the chamber, said pipes gradually decreasing in area from the inlet to the outlet end of the chamber, and said pipes offering less obstruction to the passage of the gases at the outlet end of the chamber than at the inlet end, substantially as set forth.

3. The combination of a chamber having an inlet and outlet for hot furnace-gases, a series of vertical pipes arranged in staggered relation within the chamber, and coupling-elbows for connecting the ends of said pipes to form a continuous conduit for a blast, and said pipes offering less obstruction to the passage of the gases at the outlet end of the chamber than at the inlet end, substantially as set forth.

4. The combination of a chamber having an inlet and an outlet for hot furnace-gases, a series of vertical pipes arranged in staggered relation within said chamber, each pipe having a flange at its upper and lower ends, and coupling-elbows having flanges at their ends adapted to be detachably connected to the flanges on the pipes to form a continuous conduit for a blast, and said pipes offering less obstruction to the passage of the gases at the outlet end of the chamber than at the inlet end, substantially as set forth.

5. The combination of a chamber having an inlet and an outlet for hot furnace-gases, a series of vertical pipes arranged in staggered relation within the chamber, said pipes decreasing in area from the inlet to the outlet end of the chamber and coupling-elbows for connecting the ends of the pipes to form a continuous conduit for a blast, substantially as set forth.

6. The combination of a chamber having an inlet and an outlet for hot furnace-gases, a series of vertical pipes arranged in staggered relation within the chamber, and connected to form a continuous conduit for a blast, and inclined baffles on opposite sides of the chamber for deflecting the hot gases onto the pipes, substantially as set forth.

7. The combination of a chamber having an inlet and an outlet for hot furnace-gases, a series of vertical pipes supported in the chamber between said inlet and outlet, a series of beams extending across the chamber near the upper ends of said pipes and dividing said pipes into groups, couplings for connecting the ends of the pipes to form a continuous conduit, the couplings which connect a pipe of one group with a pipe of an adjacent group extending over and across said beams, whereby when said crossing couplings are disconnected all the pipes of a group may be lifted out of the chamber together, substantially as set forth.

In testimony whereof I have signed my name to this specification in the presence of two subscribing witnesses.

HENRY W. EDWARDS.

Witnesses:
SAMUEL R. PHILLIPS,
GEO. E. MARVIN.